United States Patent [19]

Laing

[11] 4,002,936
[45] Jan. 11, 1977

[54] ELECTRIC SUBMERSIBLE PUMP

[76] Inventor: Nikolaus Laing, Hofener Weg 35-37, 7141 Aldingen near Stuttgart, Germany

[22] Filed: June 11, 1974

[21] Appl. No.: 478,385

Related U.S. Application Data

[63] Continuation-in-part of Ser. Nos. 293,103, Sept. 28, 1972, abandoned, and Ser. No. 293,105, Sept. 28, 1972, abandoned.

[30] Foreign Application Priority Data

Oct. 7, 1971 Austria .............................. 8658/71

[52] U.S. Cl. .............................. 310/166; 310/184; 417/424
[51] Int. Cl.² ...................................... H02K 17/00
[58] Field of Search ............ 310/68, 180, 166, 179, 310/112, 184, 114, 104, 90, 202–208, 66, 54, 198, 185, 87, 68 B; 417/368, 420, 424; 318/197, 201, 220 A, 226

[56] References Cited

UNITED STATES PATENTS

| 2,970,548 | 2/1961 | Berner | 310/104 |
|---|---|---|---|
| 3,354,833 | 11/1967 | Laing | 310/104 |
| 3,447,469 | 6/1969 | Laing | 417/420 |
| 3,490,379 | 1/1970 | Laing | 417/420 |
| 3,581,132 | 5/1971 | Laing | 310/166 |
| 3,649,137 | 3/1972 | Laing | 310/104 |
| 3,653,785 | 4/1972 | Dahlgren | 417/368 |

Primary Examiner—R. Skudy
Attorney, Agent, or Firm—Pennie & Edmonds

[57] ABSTRACT

An electric submersible pump having an electric motor forming a unit with the pump impeller and where the stator of the motor has 2 pm ($p$ = number of pole pairs, $m$ = number of phases) groups of coils, each group being subdivided into a plurality of coils of different width arranged symmetrically with respect to the axis of each group of coils and where the coils of each group are adapted to have different voltages applied thereto. The voltages imparted to the coils increase from the coil of smallest width to the coil of largest width by small amounts to eliminate arcing between adjacent conductors in the medium being conveyed. A portion of the liquid pumped by the impeller moves past the coils to provide cooling.

The method of operating an asynchronous motor having a plurality of coils in the stator where each coil had a single turn winding comprising the steps of applying different voltages to the coils where the voltages between adjacent coils is less than that to cause arcing between adjacent coils.

6 Claims, 14 Drawing Figures

Fig.6a
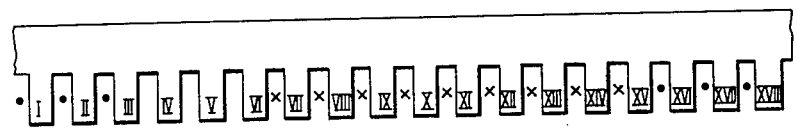
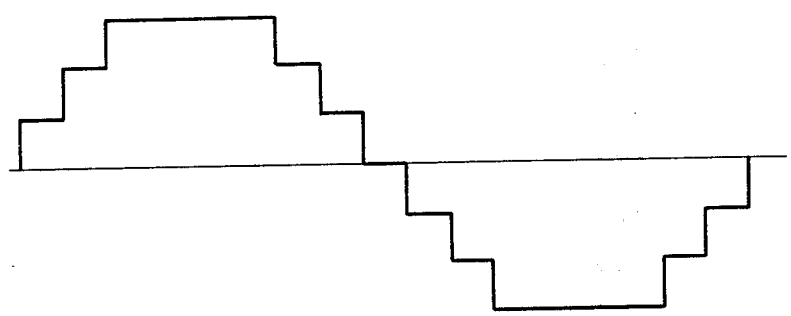
Fig.6b
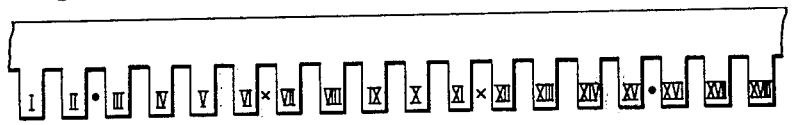
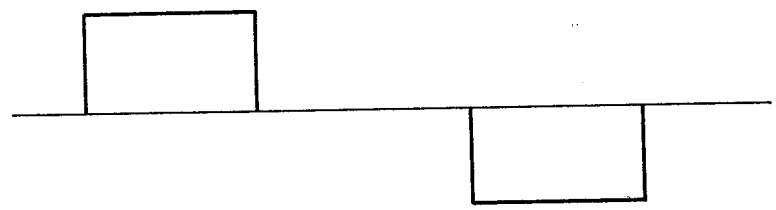

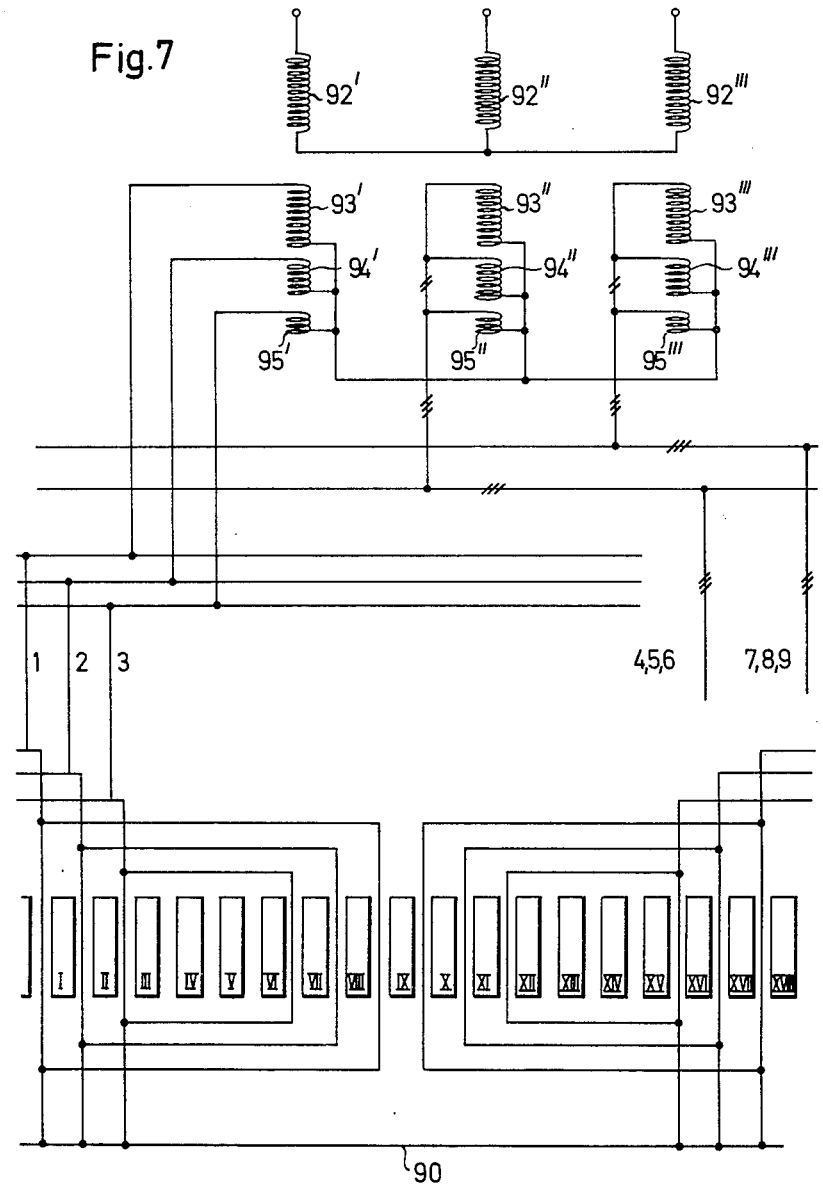

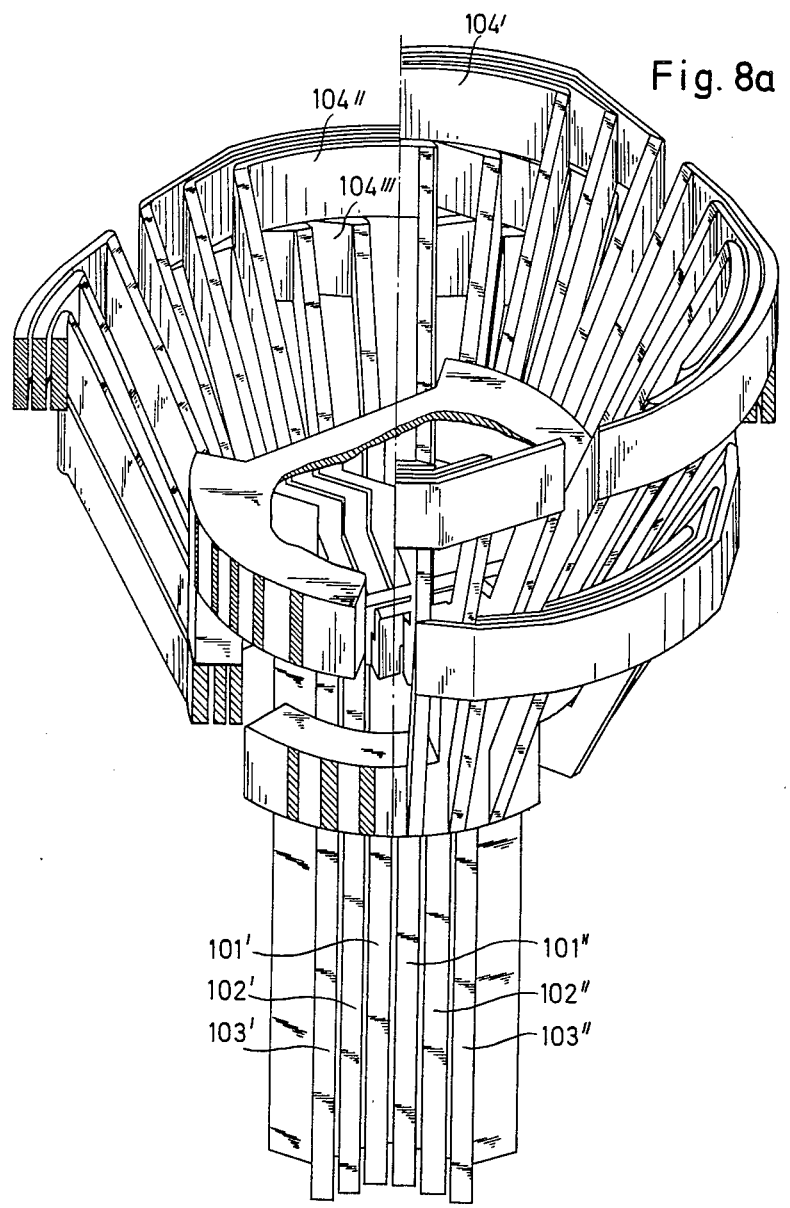

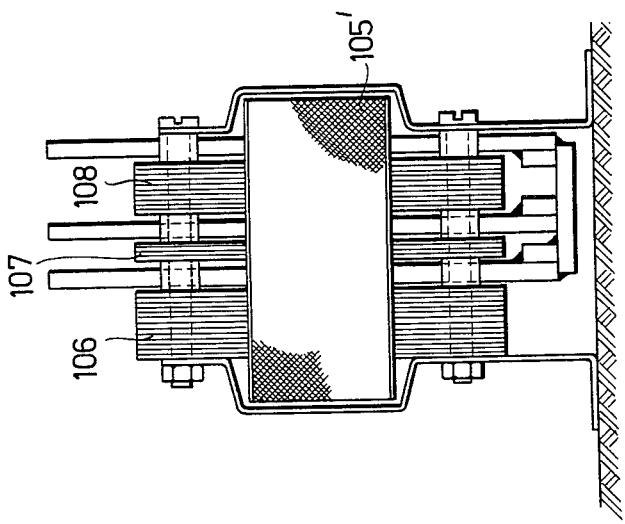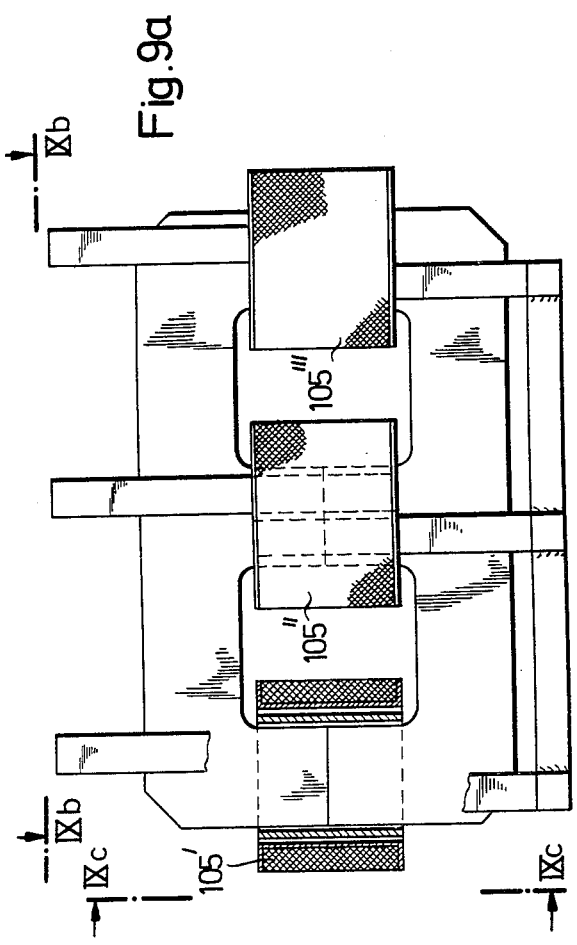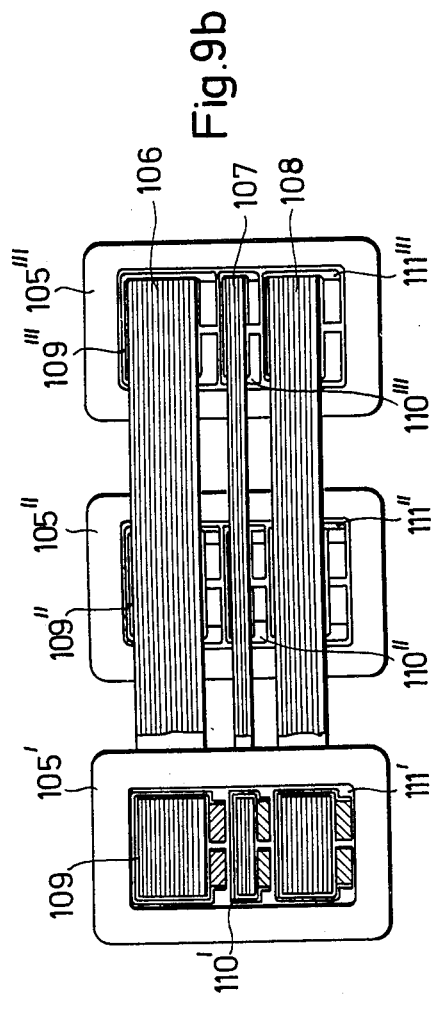

ELECTRIC SUBMERSIBLE PUMP

CROSS-REFERENCE TO OTHER APPLICATIONS

This application is a Continuation-in-Part of my copending applications Ser. No. 293,103 now abandoned, and Ser. No. now abandoned, 293,105, both filed Sept. 28, 1972.

THE PRIOR ART

Submersible pumps are known utilizing so-called "Wet motors" in which the stator as well as the rotor of the motor is immersed in the liquid being conveyed. Such pumps have in the past been utilized in deep wells and cooling of the pumps has been effected by two stages. First the heat of the windings is transmitted to the motor housing by the thermal conductivity of the liquid being pumped and then the heat of the housing is carried away by the circulated liquid. This cooling process involving two stages has been necessary because such submersible pumps usually have liquid lubricated bearings. It is desirable in such pumps to insure that no flow of liquid takes place over the bearings to eliminate the possibility of sand or other abrasive material contaminating the bearings.

Split tube type submerged pumps have also been utilized in which the windings of the stator are hermetically sealed from a rotor which is disposed in the liquid being conveyed and where the stator is separated from the rotor by a magnetically pervious housing structure. A disadvantage of split tube type pumps has been that the magnetic gap between the stator and the rotor has to be comparatively large which in turn has an adverse effect on the weight per unit power of the motor and upon its efficiency.

A further disadvantage in both the split tube type pump and the so-called "wet motor" type pump is that they are inappropriate for use in pumping liquids having high operating temperatures since such temperatures cause break down of the insulation of the conductive materials of the motor. Also the chemical properties of the liquid being pumped becomes a concern in wet motor type pumps since the liquid may attack the insulation.

It has become a problem particularly with nuclear reactors which operate at extremely high temperatures to provide for pumps which may operate under high temperature conditions at which conventional pumps would normally fail because of the effect of the temperature on the insulation of the windings.

OBJECT OF THE INVENTION

It is an object of the invention to provide for a submersible electric pump which may operate at extremely high temperatures and which will utilize the liquid being pumped to provide the necessary cooling for the motor. It is a further object to provide for a submersible electric pump which eliminates need for any insulation such that the pump may be immersed in liquids which would normally attack insulation materials.

DESCRIPTION OF THE INVENTION

The invention solves the problem in that one side of each individual coil of each coil group of an electric motor is connected via a common star point at a further star point common to all coil groups and voltages are applied to their other sides, which increase from the coil having the smallest width to the coil having the largest width of each coil group by amounts which eliminate short circuiting of adjacent conductors in the medium being conveyed. By taking advantage of the fact that various liquid media and particularly water have certain insulating properties, the invention provides operating voltages between adjacent conductors to be so small that the insulating properties of the media being pumped eliminates short circuiting or arcing between adjacent conductors.

Having regard to the small voltages which are applied to the individual coils, the cross-section of these conductors, of which the coils are made up, have to be of appropriate size, so that the coils have adequate structural stability. By reason of this structural stability it is possible, by means of spacer members or spacing means, to maintain the individual turns of the coils spaced from each other and from the pole teeth. If the medium being conveyed is hot water, the spacing means may take the form of coatings of glass or mineral fiber fabrics which, while not being waterproof, nevertheless provide the spacing of the winding turns relative to each other and to the pole teeth, while the insulating function itself is performed by the medium being conveyed, namely the water. In this construction, voltages below 40 volts have been found to be adequate at spacings between the conductors of approximately 1 mm.

In reactor vessels, glass fiber fabrics wrappings are destroyed on account of the high neutron density and on account of the high temperatures. In this case the invention envisages providing the spacing of the turns relative to each other and to the pole teeth and quite generally the spacing of the electrical conductors relative to each other by use of ceramic spacer means. These spacer means may be ceramic spheres, which are inserted matingly in recesses provided in the conductors. Preferably in this case voltages between adjacent conductors are chosen which are below 20 volts, so that metallic contaminants in the stream of the medium being conveyed cannot lead to short circuits between the conductors. Preferably when operating at voltages of this order of magnitude coils are used in the coil groups with only one turn per coil.

The invention takes advantage of the large cross-sections of the conductors in the supply leads to the stator of the pump motor are used for suspending the pump, the supply leads preferably having a section which is such that they are of maximum rigidity to resist bending. Utilizing the supply leads for the purpose of suspension simplifies the construction costs for the pump in reactor design considerably. An advantage of a pump motor constructed according to the invention and when suspended in the stream of medium being conveyed is that it eliminates the need of a shaft extending through the wall of the reactor vessel so that the problem associated with penetration of the reactor vessel and sealing of the shaft is eliminated. The invention is of great importance for reactor design because high pressures prevail in reactors and this sealing poses extremely difficult technical problems not only from the point of view of sealing but also from the point of view of the design of the reactor vessel.

Fundamentally however the new pump may be used in applications in which it was previously difficult to use a submersible motor because of installation problems. Thus a pump according to the invention may for example also be used in conventional power station boilers for circulating the water or also for conveying the water; may be used in pipe systems having extremely contaminated liquids or may also be used for conveying solvents which ordinarily attack organic insulation material.

The number of the supply leads to a stator of a motor according to the invention equals $q\,m$, where $q$ is the number of coils per coil group and $m$ the number of phases. If, for example, in a practical embodiment, each coil group includes three coils and a three-phase supply is used, nine supply leads per pump motor are required. By making each supply lead of appropriate section, these supply leads may be combined into a bundle of leads in which the individual leads are kept from each other at definite spacings by spacer means. Within the region of these spacer means, these bundles may for example be held by metal rings, which themselves are spaced from the leads by additional spacer means, so that the supply lead bundles provide very stable suspension devices.

The feature of the invention, according to which one end of each of the coils of a coil group has a voltage supplied to it such that the voltages increase by definite amounts from the coil of the smallest width to the coil of largest width, has the effect that approximately the same current flows through each coil in each coil group. This result is surprising to the extent that it has been found that when all the coils of a coil group are connected in parallel practically only the coil of smallest width i.e. the innermost coil of a coil group, conducts current. This relationship will be explained in greater detail in the description of the drawings. Thus, in an arrangement in which all coils of a coil group are connected in parallel, given the same amount of winding material, the flux density which can be achieved in the gap is considerably lower than with an arrangement in accordance with the invention.

The invention further relates to a transformer for supplying an electric motor embodying the invention whose stator has a secondary winding which is subdivided into winding sections. When using a conventional transformer for supplying an electric motor in accordance with the invention, in which the individual coils are connected to different tappings of the secondary winding, the current densities would, having regard to the high currents required, reach considerably higher values in some parts of the winding than in other parts, so that either the cross-sections of the winding would have to differ from each other considerably in different places or, if equal cross-sections are used, the winding would be substantially over-dimensioned in certain places.

The invention therefore provides a transformer for supplying a motor embodying the invention, in which different sections of the winding embrace different core cross-sections and these winding sections have one end connected to a common star point and the other end connected to the coils of the stator. Appropriately the numbers of the turns of the windings from which the individual voltages are tapped off are equal, the core cross-sections of the secondary portion of the transformer embraced by the individual windings having a particular relationship to the voltages tapped off the individual windings. The core sections which are embraced by the individual windings, are in this arrangement magnetically connected in parallel. When the supply of the individual coils of the coil groups of a motor made according to the invention are supplied by the individual windings of the transformer made according to the invention, the currents passing through these individual windings are approximately equal. By reason of the differential power outputs resulting from the different core cross-sections, the core of the secondary portion therefore has a magnetic flux passing through it homogeneously and maximum utilization of the core iron is thereby achieved.

DESCRIPTION OF THE DRAWINGS

The invention will now be explained with reference to the drawings:

FIG. 6a shows the ideal spatial distribution of the magnetic flux density in the air gap produced by one phase of a winding according to the invention;

FIG. 6b shows, by way of comparison to the arrangement shown in FIG. 6a according to the invention, the spatial distribution of the magnetic flux density in the air gap produced by one phase of the winding when the coils of a coil group are connected in parallel;

FIG. 7 shows a circuit diagram for a two-pole stator with 18 pole teeth of the type shown in FIG. 6 and the connection of the stator to a transformer according to the invention;

FIG. 8a shows a perspective view of a complete winding of a stator connected to supply leads and which has a total of three phases where the winding is of the kind shown in FIG. 8;

FIG. 9a is a partial sectional view of a transformer constructed according to the invention;

FIG. 9b is a partial sectional plan view of the transformer of FIG. 9a; and

FIG. 9c is an end view of the transformer of FIG. 9a taken along lines IXc—IXc.

DETAILED DESCRIPTION OF THE PREFERRED EMBODIMENTS

Figure 1:
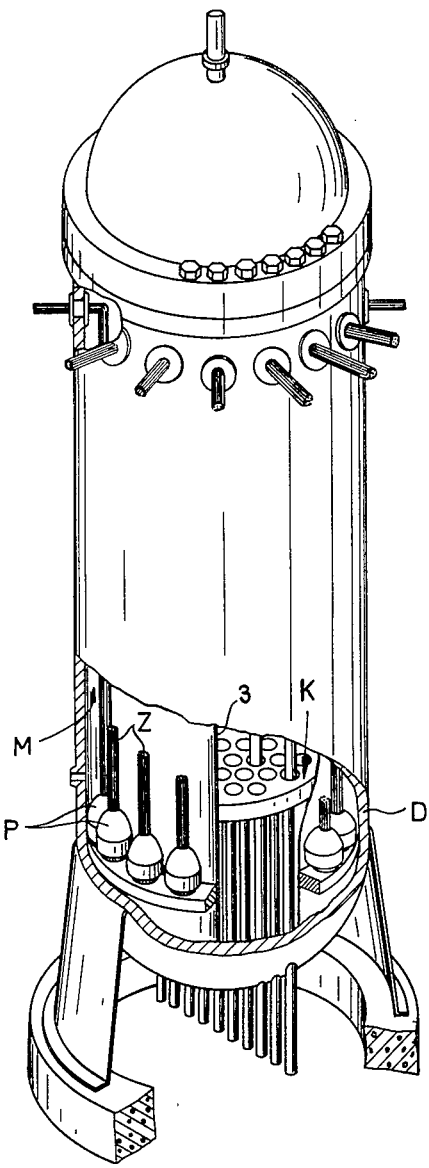
FIG. 1 shows a diagrammatic view and partly in section, a boiling water reactor having pumps with motors constructed according to the invention.

The boiling water reactor shown in FIG. 1 has a pressure vessel D which encloses the core K and the envelope chamber M. In the envelope chamber M pumps P embodying the invention are located, in which the rotor, the stator and the pump impeller each constitute a unit which are suspended by the supply leads Z in the envelope chamber.

FIG. 2 shows again diagrammatically the lower portion of the reactor shown in FIG. 1. The control rods 2 are surrounded by an envelope 3. The pumps P are located in the envelope chamber M. The through-flow takes place in the direction of the arrows 6 and 6' i.e. in a downward direction in the envelope chamber M and in an upward direction in the core chamber of the reactor. The pumps P are connected to the upper portion of the pressure vessel D by their connecting leads Z and are seated in a ring 8 which is provided with an aperture for each pump.

Figure 2:
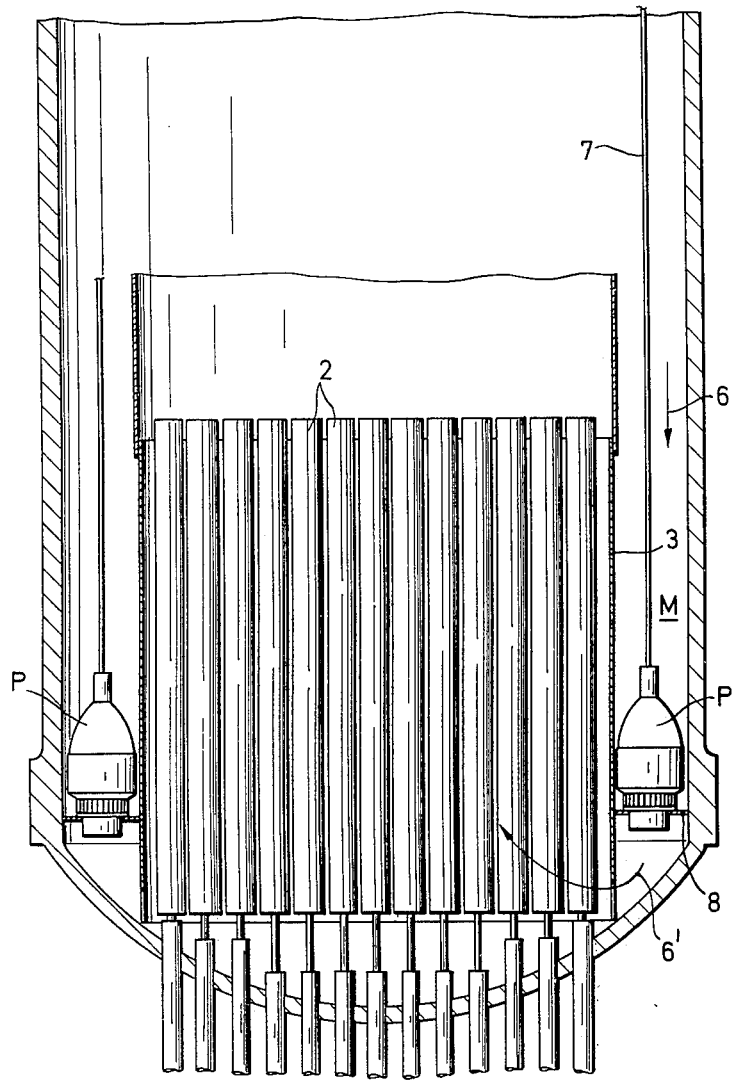
FIG. 2 shows diagrammatically a section through the lower part of the boiling water reactor shown in FIG. 1, with, however, only the most important elements shown.
Figure 3:
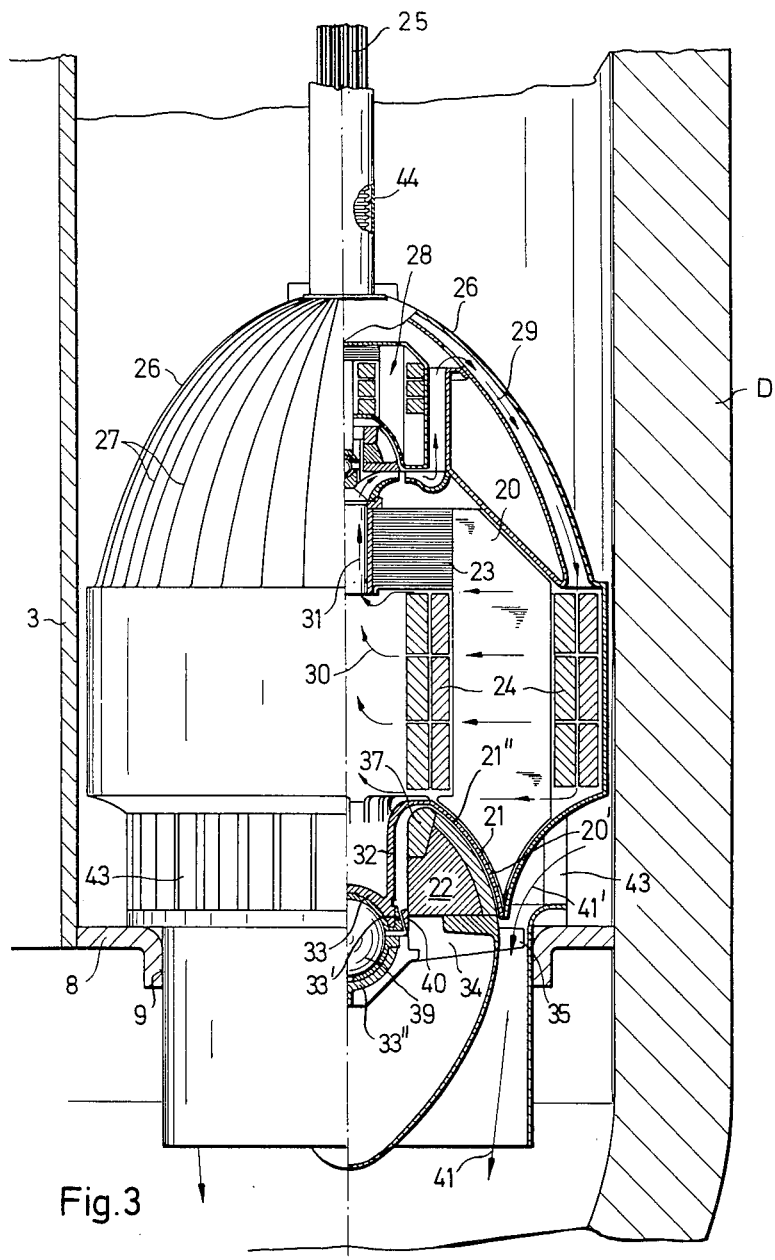
FIG. 3 shows a pump in a reactor with a motor according to the invention, partly in section, and partly in elevation, the motor being located in a housing.

FIG. 3 shows a pump of the kind used in the reactor shown in FIG. 2, partly in elevation and partly in section. The pump is located between the envelope 3 and the reactor vessel D and is seated in an aperture 9 of the annular sheet metal member 8. The stator of the motor has radially disposed sheet metal elements 20 which form pole teeth and whose frontal sides 20' together with the armature 22, define a magnetic gap 21. The magnetic return path is provided by a packet 23 of sheet metal discs. The coils 24 each have one or two turns only. The circuit of the conductors is completed inside the motor. The supply leads 25 which together form the conductor bundle 7 in FIG. 2 lead to the upper region of the pressure vessel D and form the suspension of the pump. The pump can be withdrawn in a vertical upward direction by means of the conductor bundle. The pump stator comprising the parts 20, 23, 24 may be surrounded by a stator housing 26, which has a corrugated rib profile 27.

A secondary pump 28, which in principle is of the same construction as the pump motor, may provide circulation of the cooling water inside the stator. The cooling water flows through the stator in the direction of the arrows 29, 30, 31.

A bearing column 32 has a dish 33 with a concave region and an annular convex region 33'. The pump impeller 34 with its axial blade ring 35 forms a unit with the armature 22 and the cage winding 37 which is joined to a dish 33''. A bearing sphere 39 is enclosed between the dishes 33 and 33''. A collar 40 is provided as a back-up in the convex region 33', so that the rotor cannot drop even when the pump is switched off. During start-up the rotor is, by reason of the magnetic forces and the thrust of the water being discharged and flowing in the direction of the arrow 41, pressed against the sphere. The water enters through the radial blade ring 43 in the direction of the arrow 41'. A bellows 44 provides a pressure relief volume equalization means between the interior and the exterior of the motor housing. A separating wall 21'' of non-magnetic material may be provided in the gap 21.

The pump shown is also suitable for conveying liquid metal, since the stator with its winding 24 is accommodated in a sealed housing 26. The latter is also separated from the fluid being conveyed at the magnetic gap by the separating wall at 21''. Inside the housing 26 a liquid is provided which has adequate insulating properties. The latter is caused to circulate by means of the cooling liquid circulating pump 28, so that the heat representing the losses is circulated by means of the flow of the cooling medium 29, which may for example be diphenyl or thiokol or some other thermally stable liquid, and is given off through the wall 27 to the liquid metal.

Figure 4:
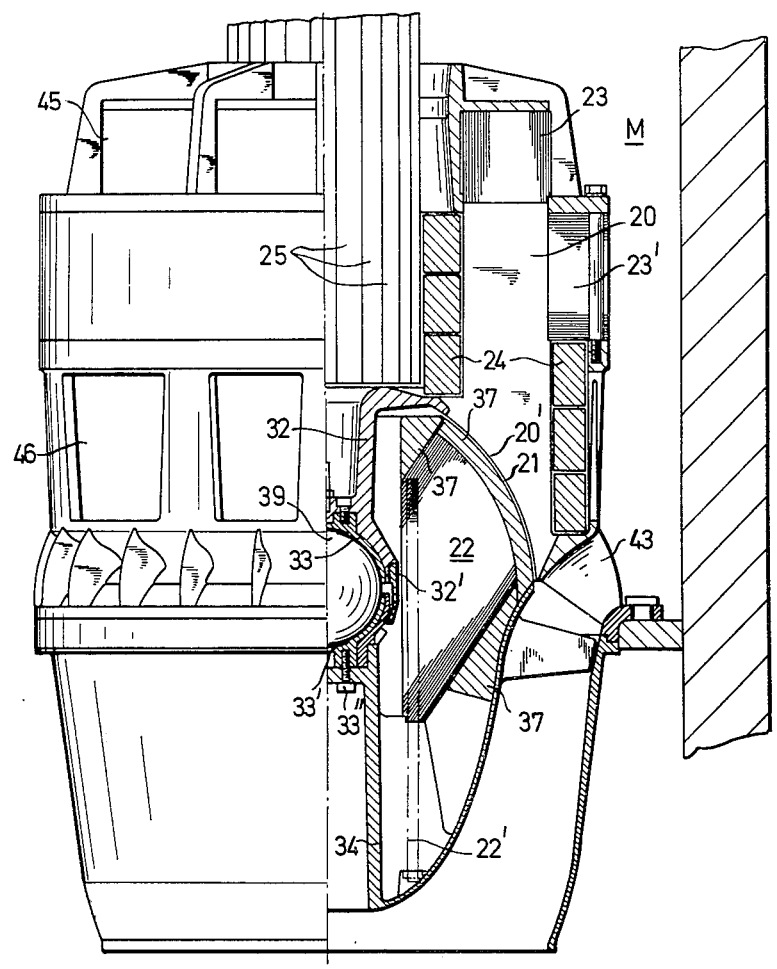
FIG. 4 shows a further embodiment of a pump according to the invention partly in section and partly in elevation, the entire motor being disposed without a housing, in the stream of the conveying mechansim.

FIG. 4 shows a similar view to that of FIG. 3 of a pump having a motor embodying the invention, whose stator is suspended in the envelope chamber M. The armature 22, which forms a unit with the cage winding 37, is of the same construction as in the embodiment shown in FIG. 5. It is supported via the bearing sphere 39 in the dish 33 which is supported relative to the stator by the column 32. A ring 32' adapted to be screwed on the column 32 backs up the dish 33', which is joined to the armature 22 via a screw connection 33'', a column 34 and a further screw connection 22'. In this way the rotor is prevented from dropping when the motor is switched off. The pole teeth are formed by radially disposed sheet metal elements 20 and bound the magnetic gap 21 by the surfaces 20' facing the armature. The various coils of the winding 24 have one turn only. The magnetic return path is provided by annular sheet metal packets 23 and 23'. The motor is suspended by the supply leads 25 which are united to form a bundle. By contrast with the motor shown in FIG. 3, the stator, in the case of the example according to FIG. 4, is located in the stream of liquid being conveyed and is cooled by it. Through apertures 45 and 46 the medium being conveyed can flow into the stator chamber and cool the winding. Thus neither a pump housing nor a stator housing is provided. The inlet blade ring 43 is secured to the stator.

Figure 5:
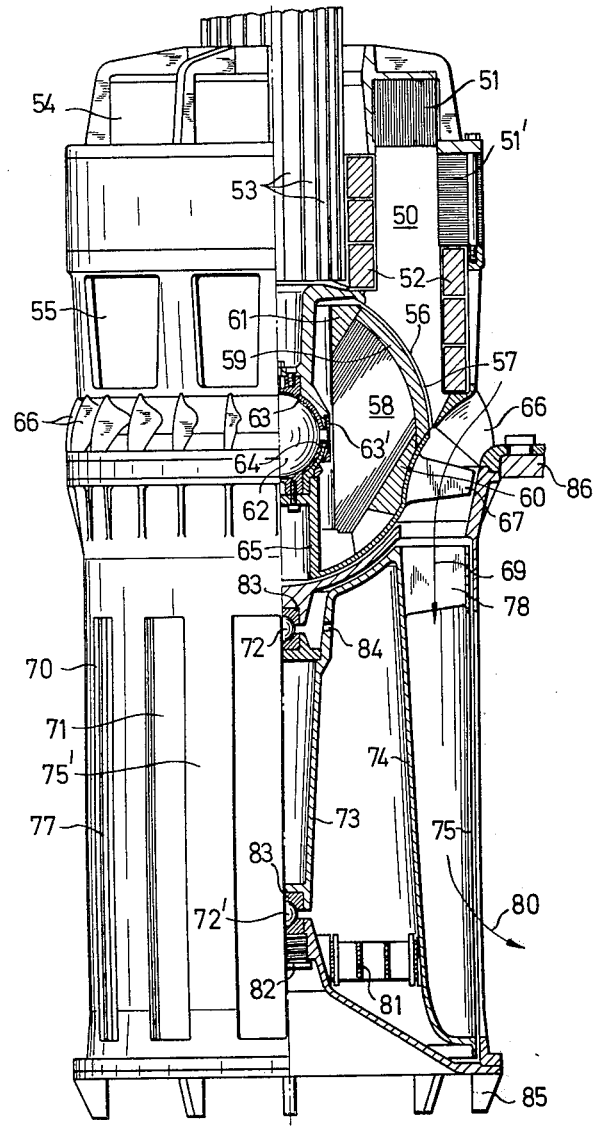
FIG. 5 shows partly in elevation and partly in cross-section a similar pump to that shown in FIG. 4, with a flap control mechanism according to the invention, which automatically prevents flow taking place through the pump when the pump impeller is not in operation.

In the embodiment shown in FIG. 5 the stator comprises the pole teeth 50, which again are formed by radial sheet metal elements. The magnetic return path is provided by annular sheet metal packets 51 and 51'. The coils of the winding 52 have one turn each. They are connected to the supply leads 53, which again form a conductor bundle, by which the pump is suspended. Through apertures 54 and 55 the medium being conveyed can flow into the stator chamber and cool the stator. The pole teeth form the magnetic gap 57 by their frontal surfaces 56. The rotor comprises an iron core 58, bars 59 and short circuiting rings 60 and 61 of a cage winding. The surface of the rotor facing the air gap 57 lies in the region of the spherical ring. The rotor is, as in the case of the embodiments shown in FIGS. 3 and 4, supported via a sphere 62, a dish 63 secured to the stator as well as a dish 64 secured to the rotor. This dish 64 is arranged on a column 65 which is joined to the rotor by screw connections. In the same way as shown in FIG. 4, a ring 63' serves to prevent the rotor from dropping when the pump is not switched on. The guide blade ring 66 is secured to the stator, while the pump blade ring 67 is located on the rotor. The medium being conveyed which flows around the stator is conveyed in the direction of the arrows 69 through the pump and enters a terminal housing 70 and leaves through slits 71. The bearings 72 and 72' in the terminal housing support a valve plug, which has a slightly conical inner surface 74 and a cylindrical outer surface 75. The outer surface has slits extending in the axial direction, which are able to register with the slits 71 of the terminal housing 70. The regions 75' between the slits 71 extend in the azimuth direction somewhat further than the slits 71, i.e. the regions between the slits 71 are somewhat wider than the latter. Likewise the bridges 77 between the slits in the outer cylinder 75 of the valve plug are somewhat wider than the slits 71 of the terminal housing.

A guide blade ring 78 is secured to the plug 73, the blades of the former being so disposed that the plug is rotated in one direction until it reaches an abutment, by the swirl of the hydraulic medium. In this position the slits of the plug register with the slits of the terminal housing and the bridges of the plug with the bridges of the terminal housing. This means, that when the pump is switched on, the flow can take place freely in the direction of the arrow 69 through the pump chamber and in the direction of the arrow 80 out of the latter. If now the flow is interrupted for any particular reason, a spirally coiled spring 81, which pre-tensions the plug in the direction opposite to that in which it is rotated by the swirl of the flow, causes this plug to be rotated in the opposite direction up to a second abutment, in which position the slits in the outer cylindrical walls 77 then register with the bridges 75 of the terminal housing on the one hand and the bridges between the slits in the outer cylindrical wall of the plug register with the slits 71 of the terminal housing on the other hand. In this position the valve defined by the terminal housing and the plug is closed so that, for example, if the pump trips, no flow produced by adjacent pumps can take place through this valve. In this way the possibility of back-flow through pumps which have tripped is eliminated.

It is emphasized that the bearing for the plug can be adjusted by means of a screw 82 which presses on the bearing dish 83. Relief bores 84 are provided for pressure equalization. Outwardly conical feet 85 facilitate insertion of the pump into the sheet metal ring 86 during assembly. Instead of the screw 82, it is also possible to provide alternative arrangements for adjusting the bearing.

Figure 6:
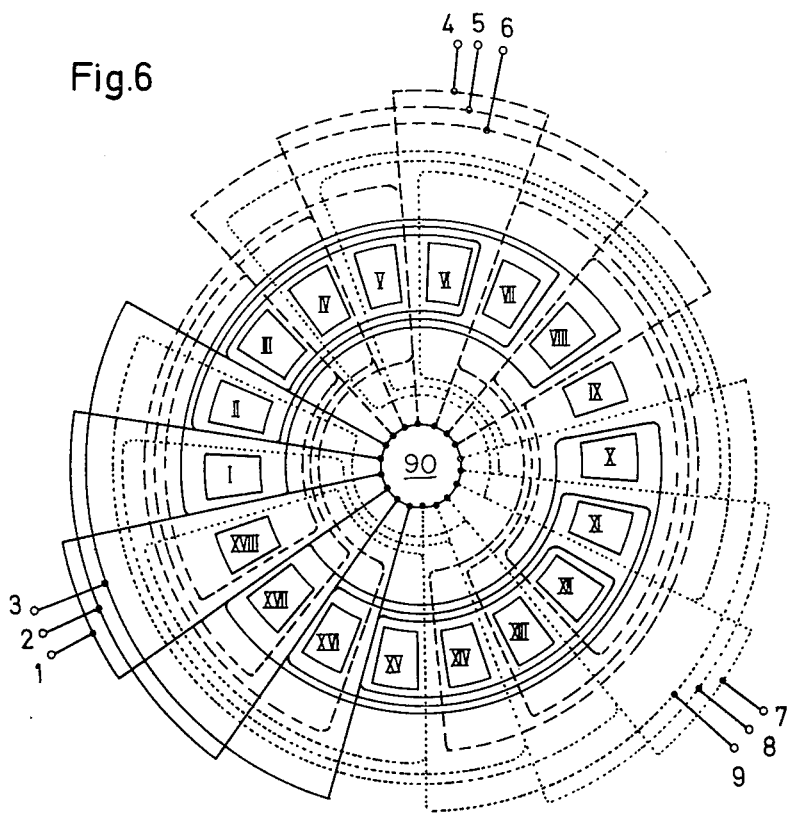
FIG. 6 shows diagrammatically a plan of a stator of a motor according to the invention with teeth designated by Roman numerals and the layout of the individual coils and coil groups which are inserted into the teeth.

FIG. 6 shows diagrammatically a stator of a motor according to the invention in plan view. The stator is intended for a two-pole machine and has 18 pole teeth I—XVIII. The broadest coil of a coil group embraces 8 pole teeth, the smallest coil of each coil group 4 pole teeth and the intermediate one 6 pole teeth each. Thus 3 coils per coil group and 2 coil groups per phase are provided in this two-pole machine. For connection to a three-phase supply, 3 phases are required. Three different phases are indicated by continuous lines, interrupted lines and dotted lines. It can also be seen how each coil is connected at one end to the star point 90. For the stator $z \times m$ ($q$ = number of coils per coil group, in this case 3, and $m$ = number of phases in this case also 3), i.e. 9 supply leads are required, which are designated 1 to 9.

As can be seen from FIGS. 6 and 7, one end each of the coils of a coil group are subjected to a voltage which decreases from the coil of greatest circumferential width in each group to the coil of smallest circumferential width. The voltages in the 3 supply leads to each individual coil group are of the same phase. Again the coils of equal width in different coil groups and different phases are subjected to voltages of the same magnitude but of different phase. The magnitudes of the partial voltages required for supplying the individual coils of a coil group are, at a first approximation, related as the chord factors sine ($2_p$ 90° $Z_s/Z$) ($p$ = number of pole paris, $Z_s$ = number of teeth embraced by one coil, $Z$ = total number of teeth of the stator) of the coils concerned.

FIG. 6a shows a developed representation of the ideal spatial distribution of the magnetic flux density in the air gap produced by one phase of the winding in accordance with the invention. It is based on the winding embodying the invention in accordance with FIG. 6 or FIG. 7 with 3 coils per coil group and 2 poles.

By comparison, FIG. 6b shows in the same manner as FIG. 6a the spatial distribution of the magnetic flux density in the air gap in the case of all coils of a coil group being supplied with the same voltage, as becomes necessary when these coils are connected in parallel. It necessarily follows according to the law of induction in the case of parallel connection of the coils of a coil group and their supply with the same voltage that all coils of a coil group have the same magnetic flux. This however is possible only when only the innermost coil of a coil group conducts current, while all the coils of greater width remain substantially without current. This disadvantage is eliminated by the winding in accordance with the invention.

FIG. 7 shows the supply for a winding according to FIG. 6 embodying the invention, via a transformer with the primary winding phases 92′, 92″, 92′″, and a secondary winding with the partial windings 93′, 94′, 95′ for the first phase, 93″, 94″, 95″, for the second phase and 93′″, 94′″, 95′″ for the third phase. Of the winding of FIG. 6, only the first phase with the teeth I-XVIII, the star point 90 and the supply leads 1, 2, 3, are shown in developed representation. In the same way the second phase is connected by the supply leads 4, 5, 6 and the third phase by the supply leads 7, 8, 9.

Figure 8:
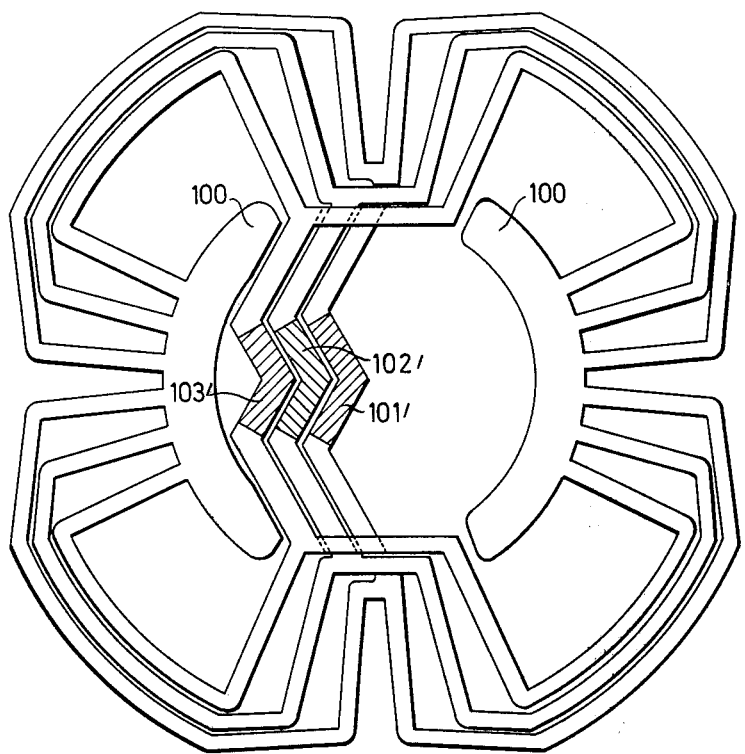
FIG. 8 shows a plan view one phase of the winding of a stator for a four-pole motor according to the invention with four coil groups, each of which has three coils of different widths.

FIG. 8 shows one phase of a winding for a motor embodying the invention with 4 coil groups, each of which has 3 coils. This phase is intended for a 4-pole machine having a stator with 36 pole teeth. One side of each coil group is connected to a star point 100 and its other side to a conductor 101′, 102′ or 103′ respectively. These conductors are again supplied with voltages of different magnitude, namely the conductor 101′ with the greatest voltage and the conductor 103′ with the smallest voltage. In the case of a three-phase supply, 3 phases are required, as shown in FIG. 8, which are relatively displaced by 60° in space and slid over the pole teeth. Such an embodiment is shown in FIG. 8a, in which the phases 104′, 104″ and 104′″ are arranged in three planes one above the other. These phases are constructed in the same manner as shown in FIG. 8 and as shown partly in section. The supply leads to the phases concerned are indicated respectively as 101′, 102′ and 103′ and 101″, 102″ and 103″. The supply leads to the third phase are not shown in FIG. 8a.

FIGS. 9a to 9c show three views of a practical embodiment of a transformer according to the invention. The primary winding 105′, 105″, 105′″ surrounds the core consisting of three portions 106, 107, and 108, while the secondary windings 109′, 109″, 109′″; 110;, 110″, 110′″; 111′, 111″, 111′″ each surround only one portion of the core, viz. 106, 107 and 108 respectively.

In this way different portions of the winding surround core portions of different cross-section. If the windings 109, 110, and 111 have the same number of turns, preferably 1 or 2, then the voltages applied to these windings are proportional to the cross-sections of the portions to which the windings are applied.

I claim:

1. An electric submersible pump having an electric motor forming a unit with a pump impeller and where said motor has a rotor connected to the pump impeller, a stator comprising a plurality of pole teeth circumferentially positioned about the axis of said stator, and a plurality of coil groups where each said group has a plurality of individual coils of varying circumferential widths symmetrically positioned within each said coil group and wherein the coils of a coil group overlie pole teeth with the coils of greater circumferential width overlying a greater number of pole teeth than coils of smaller circumferential width: the improvement comprising in that all the coils of a single coil group are electrically connected at one of their ends to a common star point, in that the common star point of all said coil groups are electrically interconnected, and in that a lead is connected to the other end of each coil of a single coil group with said lead being connectable with a single phase of a multi-phase variable voltage source such that a single phase voltage is applied to all coils of a single coil group and where the leads connected to coils of greater circumferential width are subjected to a higher voltage than leads connected to coils of a smaller circumferential width to induce substantially the same amount of current flow through all of the coils of all of the coil groups to prevent short circuiting between adjacent coils.

2. An electric submersible pump according to claim 1 the improvement further comprising in that each coil of each group comprises one turn.

3. An electric submersible pump according to claim 1 the improvement further comprising in that the supply leads to the coils of the motor are separated from each other by pre-determined distances and having in addition spacer members whereby the supply leads from a conductor bundle by which the motor may be suspended into a liquid retaining chamber.

4. An electric submersible pump according to claim 1 the improvement further comprising in having coil spacer members for spacing the individual coils of a coil group relative to each other.

5. An electric submersible pump according to claim 4, the improvement further comprising in that said spacer members comprise a ceramic material.

6. An electric submersible pump according to claim 4 the improvement further comprising in that the spacer members comprise a glass fiber material and wherein the electrical insulation between adjacent coils comprises a liquid.

* * * * *